(No Model.)
S. H. SHORT.
ELECTRIC RAILWAY.
No. 398,662. Patented Feb. 26, 1889.
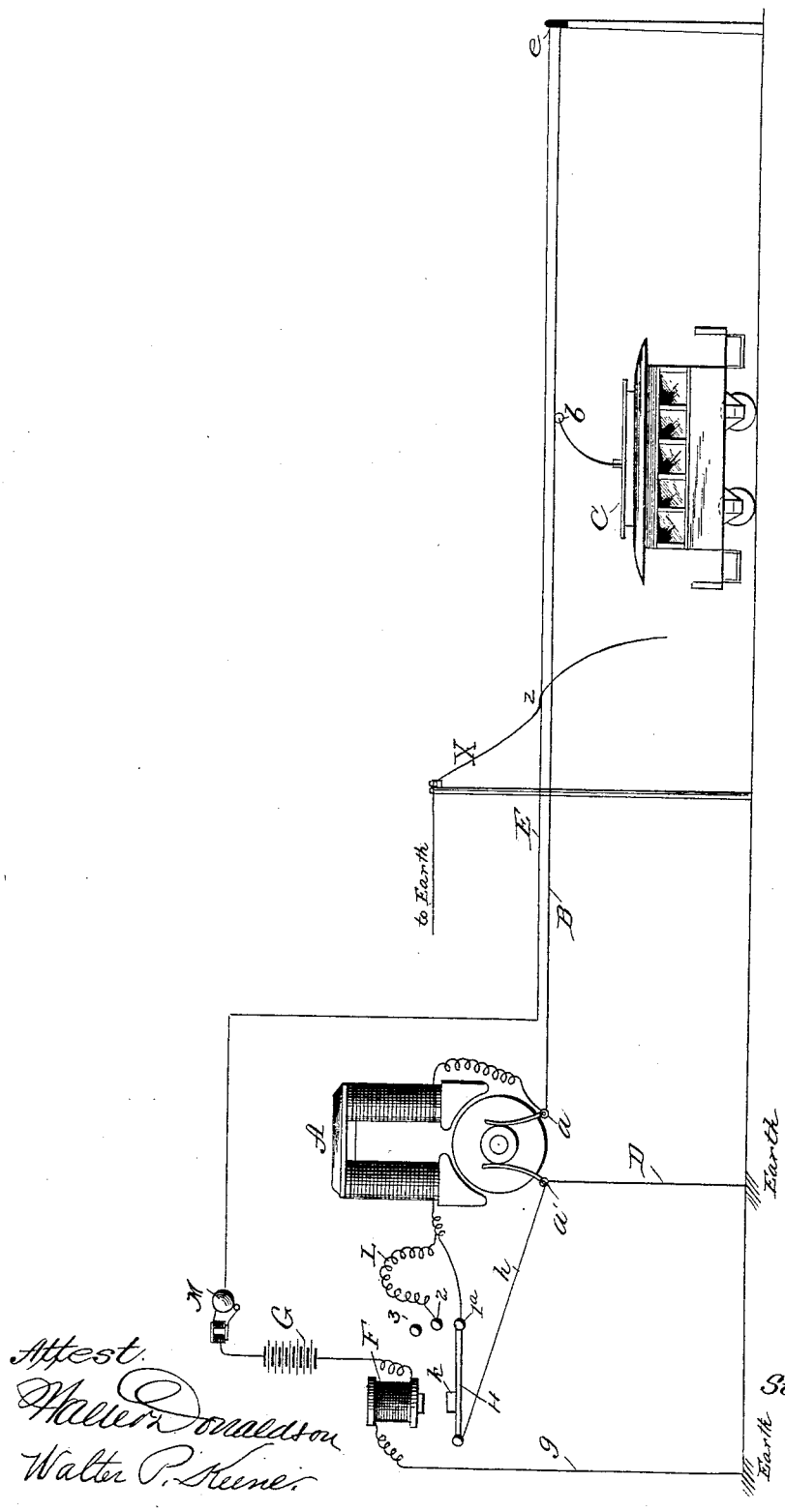
Inventor
Sidney H. Short
by Ellis Spear
Atty.
Attest.
Walter Donaldson
Walter P. Keene.

UNITED STATES PATENT OFFICE.

SIDNEY H. SHORT, OF COLUMBUS, OHIO.

ELECTRIC RAILWAY.

SPECIFICATION forming part of Letters Patent No. 398,662, dated February 26, 1889.

Application filed November 12, 1888. Serial No. 290,615. (No model.)

*To all whom it may concern:*

Be it known that I, SIDNEY H. SHORT, of Columbus, in the county of Franklin and State of Ohio, have invented a new and useful Improvement in Electric Railways; and I do hereby declare that the following is a full, clear, and exact description of the same.

My invention is designed, principally, to guard the main conductors of electric railways using the overhead system from other wires falling across the line of said wires, and to govern the current passing through the conductors automatically, so as to reduce its pressure below the danger-point; and while I have represented the invention as applied to the conductor of an electric railway it will be obvious that the invention may be applied without material change to conductors of any class used for carrying currents dangerous to life.

The invention consists, broadly, in connection with a main conductor and generator, of a guard-wire, including a source of electrical energy, forming a normally-open circuit and a controlling resistance-connection between the guard-wire and the generator, whereby the pressure on the main conductor is automatically controlled.

Further, it consists of a signaling device operated by the closing of a guard-wire circuit to indicate the contact of a foreign wire with any part of the guard-wire circuit or the conductor in connection with a generator and main conductor.

Further, it consists of a switch operated by an electro-magnet in the guard-wire circuit for controlling or reducing the pressure in the main conductor, combined with a generator and main conductor.

Further, my invention consists of a guard-wire forming a normally-open circuit and including a source of electrical energy, a switch for controlling the current to the field-magnets of the dynamo, and a series of contacts in the path of the switch and between it and the field-magnets of the dynamo, whereby the electro-motive force of the generator may be reduced to a safe pressure or the circuit through the coils of the field-magnet entirely broken.

The apparatus is shown in the accompanying drawings as applied to the conductor of an electric railway in elevation, the parts being shown in the figure simply for convenience of illustration and not in the form or proportion intended for actual use.

In the drawings, A represents a generator, on the commutator of which are two brushes, $a$ $a'$. To one of these brushes is connected the conductor B, running the length of the road and arranged to carry the current to the trolley $b$ of a car, C. The other brush, $a'$, is connected to earth and the rails of the track by wire D, completing the circuit. Another circuit normally open is formed by a guard-wire, E, arranged just above the conductor B, and having its outer end insulated upon a post, $e$, or in any suitable way. The other end of this wire enters the power-station, and is connected to one terminal of the coil of an electro-magnet, F, through a battery, G, which may represent any convenient source of electrical energy. It will be understood that the magnet F represents a convenient form of device for the purpose, but may represent any form of electro-mechanical device capable of performing the required function. The other terminal of this coil is connected to earth and the rails of the track through the wire $g$. The generator, as shown, is a "shunt-wound dynamo," in which a switch and resistance-coil are interposed between one terminal of the coil of the field-magnet and the brush on one side. This connection consists of a brush, $a'$, connected to a lever, H, by a wire, $h$, and when this lever is in its normal position on the contact-point $1^a$ a part of the current generated by the armature is through the coils of the field-magnets to the other brush sufficient to excite the field-magnets to their maximum strength, and therefore the dynamo with the lever in this position will give its maximum electro-motive force. Supposing, however, a grounded wire, X, to fall across the line of the conductor, it would come into contact with the guard-wire, as at $z$, and close its circuit. This would energize the electro-magnet and attract its armature $k$ on the lever with a force corresponding in amount to that of the comparative weak battery G in the guard-wire circuit, which would be sufficient to draw up the lever into contact with the point 2. This point 2 is connected through a resistance-coil, L, to the same terminal of the coil to which point 1ᵃ is directly connected, and the effect of this would be to put the resistance-coil L into the circuit of the field-magnet coils, and thus reduce the current in them, thereby reducing the electro-motive force of the generator to a safe pressure until the fallen wire can be removed. If, however, the foreign wire should fall also into contact with the main conductor B, the dynamo-current would pass through the coil F, and by reason of this stronger current the armature of the electro-magnet would be still more strongly attracted and the lever would be drawn to the point 3, when the brush a' would be wholly disconnected from the field-magnet, the circuit through the coil of the field-magnet entirely broken, the pressure on the line wholly destroyed, and all source of danger removed.

An electric bell, M, is placed in the circuit of the guard-wire to give an alarm at the instant a foreign wire comes in contact with the guard-wire, and the pressure in the line is impaired or interrupted.

In place of the bell shown any convenient signaling device may be substituted, and this may be located in the guard-wire circuit or in a local circuit.

It will be understood that if a series-wound dynamo is used the switch described herein may be made to shunt a portion or all of the current from its field-magnets, and thereby reduce or destroy its electrical tension or pressure.

It will also be understood that the guard-wire may serve as a protection from lightning to the main conductor, and, if desired, tips can be secured to the guard-wire at intervals.

The supporting-wires for the main conductor, which are insulated therefrom, may be in electrical connection with the guard-wire, so as to form a part of the circuit and to effect the same result should a wire come in contact or fall across such wires.

In addition to the protection against destruction of life offered by my invention, another advantage arises from its use, inasmuch as by forming a low resistance to the earth in the guard-wire circuit when the wire of any electric receptive device—such as a telephone or telegraph instrument—falls across the guard-wire or main conductor the guard-wire provides, practically, a ground by reason of its low resistance, and the instruments are thus prevented from being burned out.

I claim as my invention—

1. In combination with an electrical conductor and a generator, a guard-wire arranged in proximity to the main conductor, forming a normally-open circuit, a source of electrical energy included in the guard-wire circuit, and a controlling resistance-connection between said guard-wire and the generator, whereby in the closing of the guard-wire circuit the pressure on the main conductor is reduced, substantially as described.

2. In combination with an electrical conductor and a generator, a guard-wire arranged in proximity to the main conductor, forming a normally-open circuit, a source of electrical energy included in the guard-wire circuit, and a controlling resistance-connection automatically operated by the closing of the circuit between said guard-wire and the generator for reducing or controlling the pressure in the main conductor, substantially as described.

3. In combination with an electrical conductor and a generator, a guard-wire arranged in proximity to the main conductor, forming a normally-open circuit, a source of electrical energy, a controlling resistance-connection between said guard-wire and the generator for reducing or controlling the pressure in the main conductor, and a signaling device operated by the closing of the guard-wire circuit, substantially as described.

4. In combination with an electrical conductor and a generator, a guard-wire arranged above the main conductor, forming a normally-open circuit and including a source of electrical energy, a switch for controlling the electrical pressure on the main conductor, and an electro-magnet in the guard-wire circuit for automatically operating the switch, substantially as described.

5. In combination with an electrical conductor and a generator, a guard-wire above the conductor, forming a normally-open circuit including a source of electrical energy, a switch for controlling the electrical pressure in the main conductor, an electro-magnet in the guard-wire circuit for automatically operating the switch, and a signaling device in the guard-wire circuit, substantially as described.

6. In combination with an electrical conductor and a generator, a guard-wire forming a normally-open circuit with a source of electrical energy included therein, a switch, an electro-magnet in the guard-wire circuit for automatically operating said switch, a connection from said switch to one brush of the armature, contact-points in the path of the switch, one directly connecting with a terminal of the field-magnet and the other connecting therewith through a resistance, substantially as described.

7. In the described combination, the switch-lever, the electro-magnet in the guard-wire circuit for automatically operating the same, a connection from the lever to one of the armature-brushes, contact-points in the path of the lever, a direct connection from one contact with one terminal of the field-magnets, a resistance-coil interposed between the second contact and the field-magnet, and the third contact having no connection, whereby the full pressure of the current may be maintained, reduced, or interrupted, substantially as described.

8. In combination with an electrical conductor and a generator, a guard-wire arranged in proximity to the main conductor, forming a normally-open circuit, a source of electrical energy included in the guard-wire circuit, and a signaling device operated by the closing of the guard-wire circuit, substantially as described.

In testimony whereof I have signed my name to this specification in the presence of two subscribing witnesses.

SIDNEY H. SHORT.

Witnesses:
M. FRANC SHORT,
FRANK C. BURT.